Figure 1:
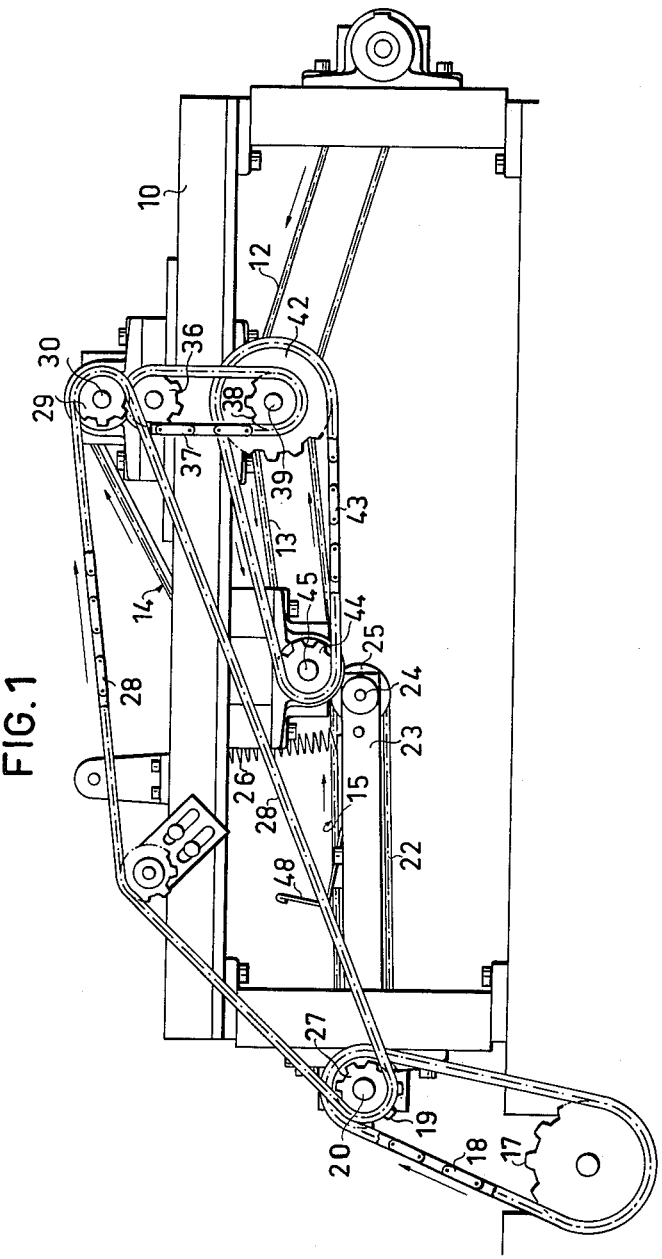

Dec. 21, 1965  B. R. J. CARLÉN  3,224,558
REVERSING BELT CONVEYOR APPARATUS
Filed Dec. 2, 1963  4 Sheets-Sheet 1

INVENTOR.
Bo Robert Junior Carlén
BY
Young + Thompson
ATTYS.

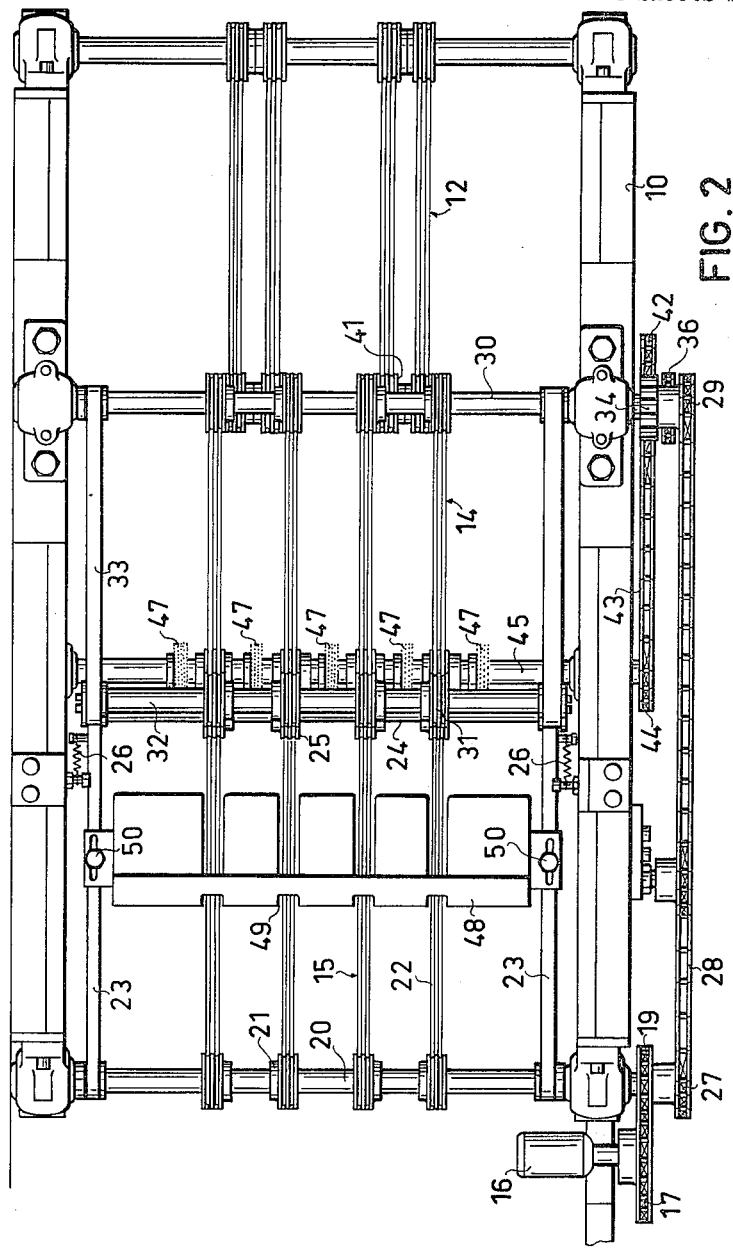

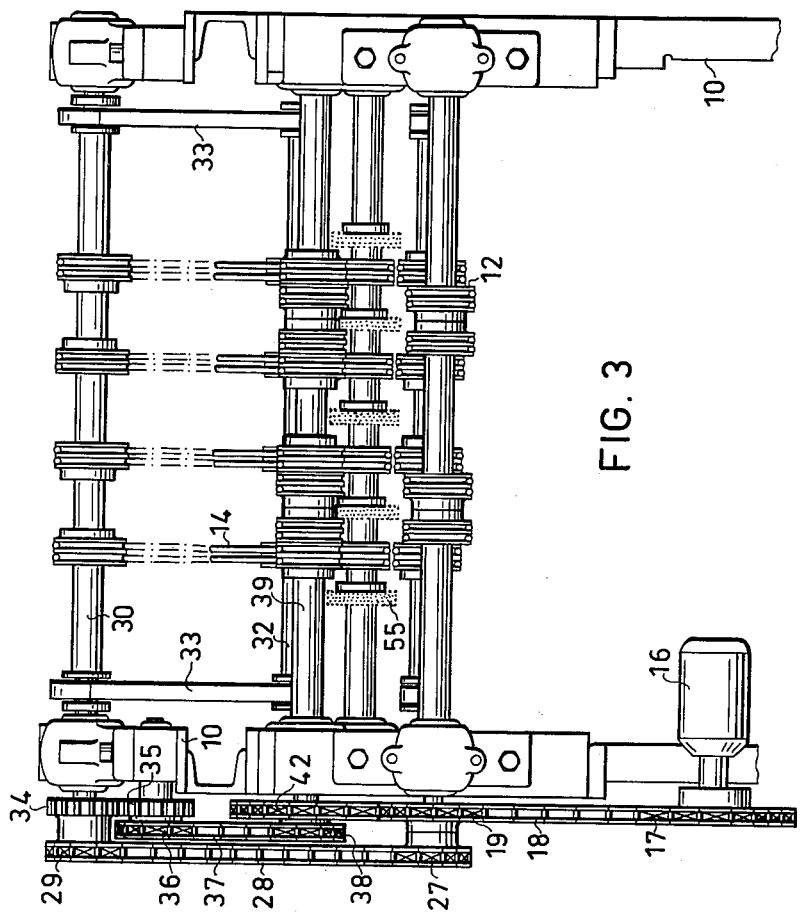

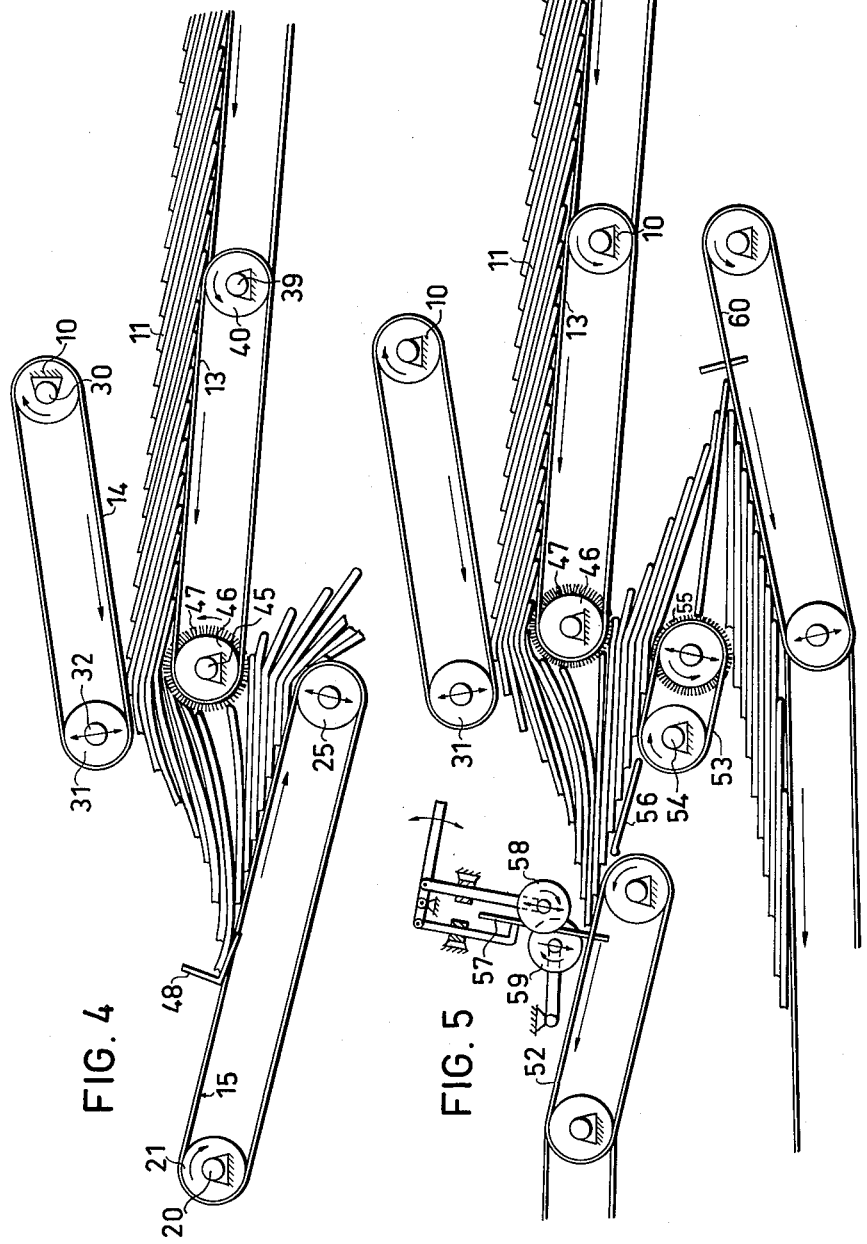

3,224,558
REVERSING BELT CONVEYOR APPARATUS
Bo Robert Junior Carlén, Stockholm, Sweden, assignor to Ab Bonnierforetagen, Stockholm, Sweden, a corporation of Sweden
Filed Dec. 2, 1963, Ser. No. 327,191
Claims priority, application Sweden, Dec. 5, 1962, 13,120/62
3 Claims. (Cl. 198—35)

The present invention relates to a reversing belt conveyor apparatus for a continuous stream of overlapping newspapers, weekly magazines and similar printed articles having a folded back edge and a cut opposite front edge. In some cases the stream should, for example, be led to a stacking apparatus or a cutting machine. However, the leading edges of the newspapers in the stream may be the cut front edges, although it would be desirable to have the folded back edges as leading edges.

The general object of the present invention is to provide a simple and reliable apparatus for reversing the position of the newspapers in the stream.

Another object of the invention is to provide an apparatus in which the stream of newspapers may be shifted to either of the two conveyors.

These and other objects of the invention will be disclosed in detail in the following with reference to the accompanying drawings showing two embodiments of the invention by way of example.

FIG. 1 is a side view of a reversing belt conveyor apparatus according to the invention. FIG. 2 is a top view, FIG. 3 is an end view, FIG. 4 is a diagrammatic side view of the apparatus in FIG. 1 illustrating its operation and FIG. 5 is a diagrammatic view of another embodiment for shifting the stream to either of two conveyors.

With reference to FIGS. 1 to 4, the frame 10 of the apparatus carries a number of endless belt conveyors which each consist of a number of parallel and spaced endless belt strings, as seen in FIGS. 2 and 3, which may consist of spiral springs, narrow belts of elastic material or the like. The conveyor belts run over pulleys driven in the directions indicated in the drawings.

The stream 11 of overlapping newspapers, weekly magazines or the like enters the apparatus on an endless belt conveyor 12 which leaves the stream to an upper conveyor 14. Above the conveyor 13 is provided a pivotally mounted conveyor 14 having its forward end resting on the resting on the stream at the discharge end of the conveyor 13 to drivingly engage the upper side of the stream.

The newspapers on the conveyor 13 have their folded back edges as trailing edges in the stream, which is the position which should be reversed in the example shown.

From the discharge end of the conveyor 13, the newspapers are discharged down on a lower conveyor 15 which is driven in opposite direction relative to the upper conveyor 13 in order to reverse the position of the newspapers so that their folded back edges will form the leading edges in the stream on the conveyor 15.

In FIGS. 4 and 5 some of the pulleys are provided with double pointed arrows pointing upwardly and downwardly to indicate that they form the end of a pivotally mounted conveyor. Accordingly the lower conveyor 15 is pivotally mounted at its rear end so that its front end may be urged by a spring device towards the discharge end of the upper conveyor 13 to form an elastic gap between the upper and lower conveyors. From this gap the newspapers may be discharged with their folded back edges as leading edges down into a stacking apparatus not shown.

The conveyors shown in FIGS. 1–4 are driven by a common electric motor 16 which by means of a chain wheel 17 and a chain 18 is connected with a chain wheel 19 secured to a shaft 20 which carries the rear pulleys 21 for the belt strings 22 forming the lower conveyor 15.

Two side arms 23 are pivotally mounted on the shaft 20 and carry a shaft 24. The front pulleys 25 of the lower conveyor 15 are rotatably mounted on the shaft 24. The arms 23 are actuated by two tension springs 26 which urge the front end of the lower conveyor 15 towards the lower side of the discharge end of the upper conveyor 13 to press the stream therebetween.

The shaft 20 further carries a fixed chain wheel 27 which by means of a chain 28 drives a chain wheel 29 fixed to a shaft 30 which is journalled in the frame 10 and carries the rear pulleys for the conveyor 14. The front pulleys 31 of the conveyor 14 are rotatably mounted on a shaft 32 which is secured between two arms 33 pivotally mounted on the shaft 30. The conveyor 14 will by means of its own weight rest with its forward end on the upper side of the stream 11 at the discharge end as shown in FIG. 4.

The chain wheel 29 is rigidly connected with a gear wheel 34 which drives an underlying gear wheel 35 fixed to a shaft journalled in the frame 10. A chain wheel 36 is fixed to this shaft and is by means of a chain 37 connected with a chain wheel 38 secured to a shaft 39 rotatably mounted in the frame 10 and carrying the front pulleys 41 of the conveyor 12.

A further chain wheel 42 is secured to the shaft 39 and has a relatively great diameter. This chain wheel is by means of a chain 43 drivingly connected with a smaller chain wheel 44 secured to a shaft 45 which rotatably carries the front pulleys 46 for the upper conveyor 13. Between the pulleys 46 are on the shaft 45 secured feeder wheels 47 in the form of brushes. The outer diameter of the rotating brushes 47 is preferably somewhat greater than the diameter of the pulleys 46 as shown in FIG. 4. Accordingly the brushes will extend outside the periphery of the conveyor belts at the discharge end and drivingly engage the trailing edges of the newspapers to rapidly urge them down on to the lower conveyor 15. In the example shown, the peripheral speed of the brushes 47 is substantially greater than that of the belt strings of the upper conveyor 13, due to the gear ratio between the greater driving gear wheel 42 and the smaller gear wheel 44 on the shaft 45 which drives the brushes 47, and this difference in speed will further increase the speed of forcing the trailing edges of the newspapers downwardly and under the brushes during the reversing operation by means of the lower conveyor 15, so that the speed of the stream may be relatively high.

The feeder wheels 47 may also have another peripheral surface than brushes for engaging the trailing edges of the newspapers. For instance, the periphery may be of rubber having a plurality of transverse grooves to provide a great number of teeth for engaging the trailing edges of the newspapers. The engagement under consideration may also be obtained by means of conveyor belts formed with a plurality of teeth or ridges for engaging said trailing edges, preferably in combination with feeder wheels 47.

At the upper part of the lower conveyor 15 is provided a stop member in the form of an angle plate 48. The lower leg of this plate extends obliquely downwardly and has fingers extending down between the belt strings of the lower conveyor, the fingers being formed by recesses 49 in the edge of the plate. The upper leg of the plate is directed upwardly and forms a stop or abutment member for the leading edges of the newspapers discharged from the upper conveyor 13. This stop member is located at a distance from the outer periphery of the brushes 47 of the discharge end of the upper conveyor which is somewhat less than the width of the newspapers between their trailing and leading edges, so that the newspapers will be somewhat pressed between the upper leg of the plate 48 and the brushes 47. This will result in that the trailing edges of the newspapers are positively engaged by the brushes 47 during a relatively great portion of the downward movement of the trailing edges.

The lower leg of the plate 48 forms a sliding surface which is directed slightly upwardly for the leading edges of the newspapers so that these edges will slide to a position where they are free from the lower conveyor 15 when they abut against the upper stop leg of the plate 48. During this sliding movement the trailing edges of the newspapers are driven downwardly by the brushes 47 as indicated in FIG. 4. Accordingly the plate 48 forms an abutment for stopping the movement of the newspapers and reversing their direction of movement.

The plate 48 extends across the lower conveyor 15, as shown in FIG. 2, and is adjustably secured to the arms 23 by means of screws 50 for adjustment to various widths of newspapers and like articles.

The apparatus shown in FIG. 5 is constructed to enable a shifting of the stream 11 on the upper conveyor 13 either to an intermediate conveyor 52 which is driven in the same direction as the upper conveyor 13, or to a lower conveyor 53 which is driven in the opposite direction as indicated in the drawing. The lower conveyor 13 is pivotally mounted at its rear end on a shaft 54 and is actuated by a spring device to urge its forward end which is provided with driven brush wheels 55, towards the underside of the discharge end of the upper conveyor 13 in the same manner as shown in FIG. 4. Between the intermediate conveyor 52 and the lower conveyor 53 is a bridging slide plate 56 which together with the adjacent end portions of the conveyors 52 and 53 forms a surface for receiving the newspapers from the upper conveyor 13.

A stop plate 57 is provided at the conveyor 52 and is movable up and down by means of any suitable mechanism, for example of the kind diagrammatically shown in the drawing. The distance between the plate 57 and the brushes 47 is somewhat less than the width of the newspapers. In its lower position which is shown, the plate 57 forms a stop for the leading edges of the newspapers so that they will be reversed and move with the stream driven by the lower conveyor 53 and the brushes 47 and 55.

Adjacent the plate 57 is one or more feeder wheels 58 which have their shafts somewhat in front of the plate and are rotated to drive the stream in the same direction as the conveyor 52 when they are lowered to engagement with the stream. In the position shown they are lifted to a resting position. When the plate 57 is moved down, the wheels 58 are lifted, and vice versa, as will be understood from the drawing. Adjacent the plate is one or more driven feeder wheels 59 having their shafts somewhat behind the plate. These wheels are carried by a pivotally mounted carrier so that the wheels will rest by their own weight to drivingly engage the stream when the plate is lifted and the stream passes below the same.

When the stream shall again be shifted to the lower conveyor 53, the plate 57 is moved down to the intermediate position where its lower edge forms a stop for the nearest leading edge of the newspapers and at the same time the plate will contact the upper side of the newspapers having its leading edge located on the opposite side relative to the plate. Last mentioned leading edge will be engaged by the wheel 59 so that this newspaper will be moved on to the conveyor 52 away from the plate 57. Thereafter, the plate will be moved down to its bottom position shown. When the plate 57 is moved down to its intermediate position the wheel 58 is simultaneously moved upwardly to its resting position.

From the lower conveyor 53 the stream may, as shown be discharged to an underlying conveyor 60 which is driven in the opposite direction relative to the lower conveyor 53 and has a stop member of the kind disclosed above.

The apparatus shown in FIG. 5 may for example be used for alternatively shifting the stream from one to the other of two receiving stations.

What is claimed is:

1. A reversing belt conveyor appparatus for a stream of overlapping newspapers, weekly magazines and similar printed articles having a folded back edge and an opposite cut front edge, comprising an upper endless belt conveyor driven in one direction and a lower endless belt conveyor driven in the opposite direction to reverse the direction of movement of newspapers received from the discharge end of the upper conveyor, a stop member located in front of said discharge end and forming an abutment for the newspapers, the distance between said stop member and said discharge end being somewhat less than the width between the trailing and leading edges of the newspapers, said discharge end including driven feeder members concentric with the pulleys of the upper conveyor at its discharge end and having a periphery for engagement with the trailing edges of the newspapers when their leading edges abut said stop member so as to rapidly urge the newspapers down to the lower conveyor, said feeder wheels being provided also to engage the stream of newspapers when moving in said opposite direction on the lower conveyor, and in which the lower conveyor forms the end portion of a surface for receiving the newspapers from the upper conveyor, the opposite end portion of said surface being formed by the end of an intermediate endless belt conveyor driven in the same direction as the upper conveyor and provided to receive the leading edges of the newspapers leaving the discharge end of the upper conveyor, said stop member being associated with said intermediate conveyor and provided to be raised to permit the newspapers to pass on to said intermediate conveyor when desired.

2. An apparatus as defined in claim 1, in which a driven feeder wheel is provided at said stop member to drivingly engage the newspapers just in front of said stop member when it is raised said feeder wheel being provided to be lifted to a resting position when the stop member is lowered to its effective abutting position a further driven feeder wheel being provided to drivingly engage the upper side of the newspaper just behind said stop member.

3. An apparatus as defined in claim 2 in which said lower conveyor is provided to discharge the newspapers to an underlying conveyor driven in opposite direction to the lower conveyor and provided with a stop member for the edges of the neswpapers, said stop member being located at a distance from the discharge end of the lower conveyor which is somewhat less than the width of the newspapers.

References Cited by the Examiner

UNITED STATES PATENTS

| | | | |
|---|---|---|---|
| 2,787,363 | 4/1957 | Howdle | 198—165 |
| 2,857,042 | 10/1958 | Gaubert | 198—190 |
| 3,087,725 | 4/1963 | Duncan | 271—71 |

SAMUEL F. COLEMAN, *Primary Examiner.*

RICHARD E. AEGERTER, *Examiner.*